United States Patent
Han et al.

(10) Patent No.: US 11,416,382 B2
(45) Date of Patent: Aug. 16, 2022

(54) CHANGE LIST-BASED SNAPSHOTS OF APPLICATIONS FOR DEVELOPMENT AND TESTING

(71) Applicant: salesforce.com, inc., San Francisco, CA (US)

(72) Inventors: Rui Han, Richmond (CA); Armin Bahramshahry, West Vancouver (CA)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/025,039

(22) Filed: Sep. 18, 2020

(65) Prior Publication Data

US 2022/0091969 A1 Mar. 24, 2022

(51) Int. Cl.
*G06F 9/44* (2018.01)
*G06F 9/445* (2018.01)
(Continued)

(52) U.S. Cl.
CPC ............ *G06F 11/3688* (2013.01); *G06F 8/30* (2013.01); *G06F 8/41* (2013.01); *G06F 8/71* (2013.01); *G06F 9/45558* (2013.01); *G06F 11/3664* (2013.01); *G06F 11/3692* (2013.01); G06F 2009/45562 (2013.01)

(58) Field of Classification Search
CPC ............ G06F 11/3688; G06F 11/3664; G06F 11/3692; G06F 8/30; G06F 8/41; G06F 8/71; G06F 9/45558; G06F 2009/45562
See application file for complete search history.

(56) References Cited

U.S. PATENT DOCUMENTS

| 5,577,188 A | 11/1996 | Zhu |
| 5,608,872 A | 3/1997 | Schwartz |

(Continued)

OTHER PUBLICATIONS

David Georg Reichelt, PeASS: A Tool for Identifying Performance Changes at Code Level, 2019, pp. 1146-1149. https://ieeexplore.ieee.org/stamp/stamp.jsp?tp=&arnumber=8952552&isnumber=8952167 (Year: 2019).*

(Continued)

*Primary Examiner* — Mongbao Nguyen
(74) *Attorney, Agent, or Firm* — Todd A. Noah; Dergosits & Noah LLP

(57) ABSTRACT

Change list-based snapshots of applications for development and testing are described. A system selects a change list corresponding to at least one change in an application executed by a virtual machine. The system creates a snapshot of the application corresponding to the change list. The system associates the snapshot of the application with the change list. The system stores the snapshot of the application with snapshots of versions of the application associated with change lists. The system receives a request to create another virtual machine based on a version of the application corresponding to a specified time and/or a specified change list. The system retrieves an application snapshot that is associated with the specified time and/or the specified change list. The system creates the other virtual machine based on the application snapshot. The other virtual machine executes the version of the application corresponding to the specified time and/or the specified change list.

20 Claims, 4 Drawing Sheets

(51) Int. Cl.
  *G06F 9/455* (2018.01)
  *G06F 11/36* (2006.01)
  *G06F 8/71* (2018.01)
  *G06F 8/41* (2018.01)
  *G06F 8/30* (2018.01)

(56) References Cited

U.S. PATENT DOCUMENTS

| | | | |
|---|---|---|---|
| 5,649,104 A | 7/1997 | Carleton | |
| 5,715,450 A | 2/1998 | Ambrose et al. | |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier | |
| 6,654,032 B1 | 11/2003 | Zhu | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,340,411 B2 | 3/2008 | Cook | |
| 7,356,482 B2 | 4/2008 | Frankland et al. | |
| 7,401,094 B1 | 7/2008 | Kesler | |
| 7,620,655 B2 | 11/2009 | Larsson | |
| 7,698,160 B2 | 4/2010 | Beaven et al. | |
| 7,730,478 B2 | 6/2010 | Weissman | |
| 7,779,039 B2 | 8/2010 | Weissman et al. | |
| 7,779,475 B2 | 8/2010 | Jakobsen et al. | |
| 7,851,004 B2 | 12/2010 | Hirao et al. | |
| 8,010,663 B2 | 8/2011 | Firminger et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven et al. | |
| 8,095,594 B2 | 1/2012 | Beaven et al. | |
| 8,209,308 B2 | 6/2012 | Jakobson et al. | |
| 8,275,836 B2 | 9/2012 | Beaven et al. | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 9,436,585 B1 * | 9/2016 | Bak | G06F 8/71 |
| 10,127,066 B1 * | 11/2018 | Sethuramalingam | G06F 8/65 |
| 10,459,655 B1 * | 10/2019 | Greenwood | G06F 3/061 |
| 10,564,987 B1 * | 2/2020 | Lepine | G06F 8/65 |
| 10,635,566 B1 * | 4/2020 | Talluri | G06F 11/3404 |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2004/0001092 A1 | 1/2004 | Rothwein et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes Leon et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2009/0063415 A1 | 3/2009 | Chatfield et al. | |
| 2009/0100342 A1 | 4/2009 | Jakobsen | |
| 2009/0177744 A1 | 7/2009 | Marlow et al. | |
| 2012/0233137 A1 | 9/2012 | Jakobsen et al. | |
| 2012/0254824 A1 * | 10/2012 | Bansod | G06F 8/71 717/101 |
| 2013/0218948 A1 | 8/2013 | Jakobsen | |
| 2013/0218949 A1 | 8/2013 | Jakobsen | |
| 2013/0218966 A1 | 8/2013 | Jakobsen | |
| 2014/0359537 A1 | 12/2014 | Jakobsen et al. | |
| 2015/0007050 A1 | 1/2015 | Jakobsen et al. | |
| 2015/0095162 A1 | 4/2015 | Jakobsen et al. | |
| 2015/0172563 A1 | 6/2015 | Jakobsen et al. | |

(56) References Cited

U.S. PATENT DOCUMENTS

| | | | |
|---|---|---|---|
| 2016/0124665 A1* | 5/2016 | Jain | H04L 61/2007 |
| | | | 711/162 |
| 2016/0232021 A1* | 8/2016 | Bucknell | G06F 9/45558 |
| 2017/0235569 A1* | 8/2017 | Sturtevant | G06Q 10/06393 |
| | | | 717/102 |
| 2017/0344345 A1* | 11/2017 | Fan | G06F 8/30 |
| 2019/0163460 A1* | 5/2019 | Kludy | G06F 8/63 |
| 2019/0163763 A1* | 5/2019 | Pandey | G06F 11/301 |
| 2019/0227878 A1* | 7/2019 | Agarwal | G06F 11/1448 |
| 2019/0370124 A1* | 12/2019 | Sadavarte | G06F 11/1446 |
| 2020/0026571 A1* | 1/2020 | Bahramshahry | G06F 9/5005 |
| 2020/0125485 A1* | 4/2020 | Wiener | G06F 11/3466 |
| 2020/0272427 A1* | 8/2020 | Wang | G06F 8/65 |
| 2020/0371898 A1* | 11/2020 | Aouad | G06F 9/45558 |
| 2020/0379752 A1* | 12/2020 | Rodrigues Rosa Junior | |
| | | | G06F 16/137 |
| 2021/0133326 A1* | 5/2021 | Wu | G06F 11/1471 |
| 2021/0255847 A1* | 8/2021 | Jean-Louis | G06F 8/71 |

OTHER PUBLICATIONS

Shinya Kitajima, Operation Changes Recommendation Method using Histories of Operation Changes in Cloud Computing Environment, 2015, pp. 1-9. https://ieeexplore.ieee.org/stamp/stamp.jsp?tp=&arnumber=7396173 (Year: 2015).*

Peter F. Klemperer, High-Performance Memory Snapshotting for Real-Time, Consistent, Hypervisor-Based Monitors, May 2020. pp. 518-535. https://ieeexplore.ieee.org/stamp/stamp.jsp?tp=&arnumber=8291512 (Year: 2020).*

* cited by examiner

CHANGE LIST-BASED SNAPSHOTS OF APPLICATIONS FOR DEVELOPMENT AND TESTING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Source control management may be known as version control, revision control, source code management, or source control in the disciplines of software engineering, software configuration management, and software development. Source control management is a class of systems responsible for tracking and managing changes to the source code, configuration files, metadata, and documentation of an application, which enables software developers to work on their intended versions of an application. An application can be a computer program or piece of software designed and written to fulfill a particular purpose of a user. When a software developer makes revisions to an application, a source control management system can identify such revisions with a revision identifier, such as "revision 1" or "revision 2," a timestamp, and an identifier of the software developer. A source control management system can also compare revisions of an application and enable software developers to track each other's revisions to the application, correct problems, and reverse a version of an application to any prior version of the application.

As software developers design, develop and deploy an application, different versions of the same application may be deployed in different sites so the software developers may work simultaneously on revising the same application. Software developers may correct all problems in one version of an application, which may be referred to as a branch and may be ready to be released to customers, while other software developers may introduce new features in another version of the application, which may be referred to as a trunk and may include new problems. Consequently, software developers need to be able to retrieve and run different versions of the same application to determine in which version(s) the problems occur, and then identify and correct the problems.

After a software developer checks out or retrieves source code from a software source code repository and revises the checked-out source code on the software developer's computer, the source code revisions are not immediately reflected in the source code repository until the software developer checks in or commits the working copy of the source code to the source code repository. In a source control management system that enables atomic commits of multiple software developers' revisions, a change list (which may be known a change set, an update, or a patch) can be a set of all revisions made to an application since a point in time. Since a change list can also represent a sequential view of the source code for a set of revisions, a software developer can use a change list's identifier to retrieve and review the revisions to the source code that correspond to the change list.

A software developer (who may be the same as or different from a test engineer) can test an application through test automation, which is the use of software to configure test preconditions, controls, and reporting functions, to control the execution of tests, and to compare actual test results to predicted test results. Running such tests may be referred to as running a workload, and such tests may include functional tests (ftest), unit test (utest), selenium tests of browsers, and other types of tests. In contrast to a single tool that performs a specific testing task, a test automation framework, which may be referred to as an autobuild system, is a set of tools that provide automated application testing in a unified manner via a common platform for testing applications. A software developer can use a test automation framework to integrate function libraries, data sources, object details, and various reusable modules in a set of test files. A test automation framework can enable a software developer to define the format in which to express expectations, to create a mechanism that drives the application which is being tested, to execute tests of the application, and to report the results of the tests. A software developer can use a test automation framework to create a test file set that specifies a test case for the application to be tested, specify the test data to be input to the test case, and specify how and where to output the test results from the test case. If a software developer revises the test case for the application that is being tested, the software developer may need to modify only the test file set's test case if the test files specifying how and where to output the test results from the test case and specifying the test data to be input to the test case remain unmodified.

A test automation framework can distribute the testing of an application by using a hypervisor to create multiple virtual machines that each run their test cases of the numerous test cases needed to thoroughly test the application. A virtual machine can be a software implementation of a computer that executes programs like a physical machine. A virtual machine may execute an application that is created from a base image, which may be a set of software files associated with the same time, such as a Linux base image that includes files for a Customer Relationship Management (CRM) application's source code, metadata, and database that were running on a Linux virtual machine in a test environment at 2:00 A.M. When a software developer selects the version of the application to be executed by a virtual machine, the test automation framework can select the base image and the change list for that version of the application. Then the test automation framework stores the application in the virtual machine, such as by synchronizing the source code from the base image with the perforce (P4) source code from the change list, downloading the core-app JAR files (metadata changes which may be referred to as artifacts) for the change list, and compiling the metadata that enables the correct execution of the synchronized source code.

BRIEF DESCRIPTION OF THE DRAWINGS

In the following drawings like reference numbers are used to refer to like elements. Although the following figures

DETAILED DESCRIPTION

General Overview

Figure 1:
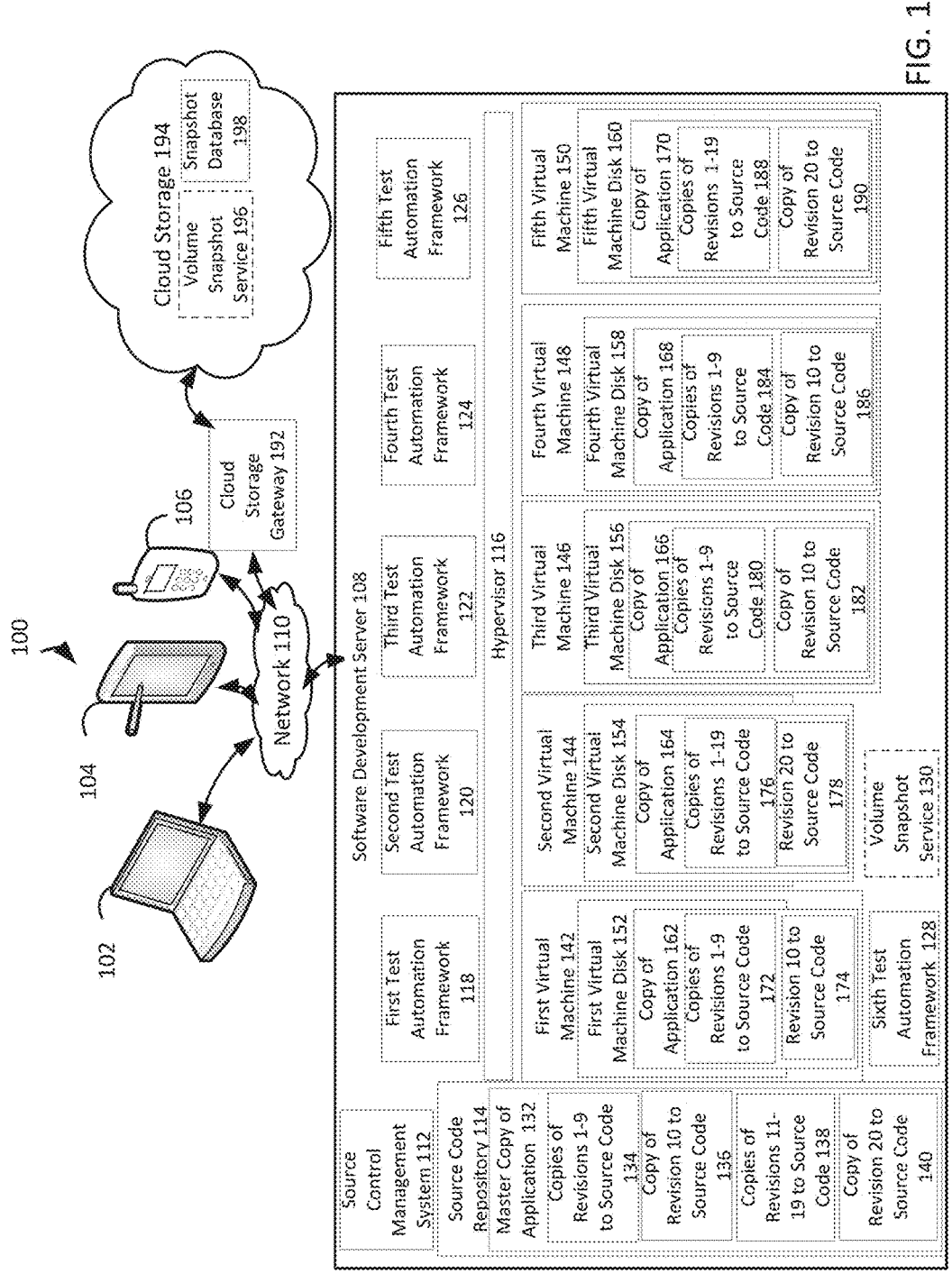
FIG. 1 is a block diagram of a high-level overview of a system for change list-based snapshots of applications for development and testing, in an embodiment.

After a hypervisor creates virtual machines to distribute numerous test cases for testing an application, a test automation framework may spend a significant amount of computing resources on repeatedly synchronizing the same source code from a base image and a change list for each of the virtual machines, and also downloading and compiling the same metadata changes for each of the virtual machines. As software developers increase the amount of revisions to an application after the current base image was created and before the next base image is created, the amount of the source code that must be synchronized and the amount of metadata changes that need to be downloaded and compiled also increases. Therefore, repeatedly synchronizing the increasing amounts of the source code for each of the virtual machines and repeatedly downloading and compiling the increasing amount of metadata changes for each of the virtual machines results in increasing the amount of computer resources that are spent on setting up the virtual machines.

Furthermore, a software developer may need to use a specific version of an application to retry tests of the application over time. However, a test automation framework may not have access to the specific base image that was used to generate the specific version of the application after the source control management system generates new base images for the same application. For example, a test automation framework can use Tuesday morning's base image and Tuesday afternoon's change list to synchronize the source code for an application that produced specific errors when tested on Tuesday afternoon. If on Thursday the test automation framework subsequently uses Thursday morning's base image and the software developer's change list from Tuesday afternoon to synchronize the source code for the application, executing this synchronized source code may unintentionally result in different errors than Tuesday afternoon's test errors.

Similarly, when the test automation framework runs a full test on Tuesday that requires more than 24 hours to complete, the tested application's source code may be based on Tuesday morning's base image and Wednesday morning's base image, which can result in creating tests errors on Wednesday that the testing of the source code would not have created on Tuesday. Additionally, if the test automation framework reruns a tests that resulted in an error when the full test on Tuesday required more than 24 hours to complete, the full test's error may have occurred because the full test executed source code synchronized from Tuesday morning's base images, but the subsequent retest may not be able to reproduce the error because the retest resulted in executing source code that was synchronized from Wednesday morning's base image. Since these changing errors may include false positive test failures and false negative test failures, a software developer spending time to investigate such test failures can lower the productivity of the software developer.

In accordance with embodiments described herein, there are provided systems and methods for change list-based snapshots of applications for development and testing. A system selects a change list corresponding to at least one change in an application executed by a virtual machine. The system creates a snapshot of the application corresponding to the change list. The system associates the snapshot of the application with the change list. The system stores the snapshot of the application with snapshots of versions of the application associated with other change lists. The system receives a request to create another virtual machine based on a version of the application corresponding to a specified time and/or a specified change list. The system retrieves an application snapshot that is associated with the specified time and/or the specified change list. The system creates the other virtual machine based on the application snapshot. The other virtual machine executes the version of the application corresponding to the specified time and/or the specified change list.

For example, a server selects a change list which indicates that the software developer Bob used his virtual machine to create a revision of the source code for generating sales opportunity data in his copy of a CRM application, and that at 5:00 P.M. on Tuesday Bob committed this revision to a source code repository. The server initiates a snapshot service to create a snapshot of Bob's copy of the CRM application, which includes his revision of the source code for generating sales opportunity data, by creating a snapshot of his virtual machine disk in his virtual machine. The server associates the snapshot of Bob's copy of the CRM application with the change list that references his revision of the source code for generating sales opportunity data. The server sends the snapshot of Bob's copy of the CRM application, which includes his revision of the source code for generating sales opportunity data, to a snapshot database in cloud storage. The server receives a request at 9:00 A.M. on Thursday from Bob's coworker Chris to create a virtual machine for Chris based on the change list created at 5:00 P.M. on Tuesday, which reference Bob's copy of the CRM application that includes his revision of the source code that generates sales opportunity data. The server uses the snapshot service to identify the snapshot which was created for the change list committed at 5:00 P.M. on Tuesday, and retrieves the snapshot of Bob's copy of the CRM application, which includes his revision of the source code that generates sales opportunity data, from the snapshot database in the cloud storage. The server uses the snapshot of Bob's copy of the CRM application, which includes his revision of the source code that generates sales opportunity data, to create Chris' virtual machine. Chris' virtual machine executes Chris' copy of the CRM application, which includes Chris' copy of Bob's revision of the source code that generates sales opportunity data. Even though Chris requested for a version of an application which has not been used for more than a day to be used to create a virtual machine for further development and possible testing of the application, the server efficiently and quickly created the virtual machine exactly as Chris requested, which may not have been possible if daily base images were still being used to create virtual machines.

Systems and methods are provided for change list-based snapshots of applications for development and testing. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. The following detailed description will first describe a system for change list-based snapshots of applications for development and testing. Next, methods for change list-based snapshots of applications for development and testing will be described with reference to example embodiments.

While one or more implementations and techniques are described with reference to an embodiment in which change list-based snapshots of applications for development and testing are implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

FIG. 1 illustrates a block diagram of a system that implements change list-based snapshots of applications for development and testing, under an embodiment. As shown in FIG. 1, system 100 may illustrate a cloud computing environment in which data, applications, services, and other resources are stored and delivered through shared datacenters and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a server 108 that may be provided by a hosting company. The first client 102 may be a laptop computer and may be referred to as the software developer Ann's client 102, the second client 104 may be a tablet computer and may be referred to as the software developer Bob's client 104, the third client 106 may be a mobile telephone such as a smart phone and may be referred to as the software developer Chris' client 106, and the server 108 may be a computer capable of hosting multiple virtual machines. The clients 102-106 and the server 108 communicate via a network 110.

The server 108, which may be referred to as a software development server 108, includes a source control management system 112, a source code depository 114, and a hypervisor 116. The software development server 108 can also include test automation frameworks, such as a first test automation framework 118, a second test automation framework 120, a third test automation framework 122, a fourth test automation framework 124, a fifth test automation framework 126, and a sixth test automation framework 128, and a volume snapshot service 130. The first through sixth test automation frameworks 118-128 may be referred to as the first through fifth autobuild systems 118-126 and the snapshot autobuild system 128. The source code depository 114 includes master copies of applications, such as a master copy of application 132, which may be referred to as the CRM application 132. The master copy of application 132 includes copies of revisions of source code, such as copies of revisions 1-9 to source code 134, a copy of revision 10 to source code 136, which may be referred to as the copy of revision 10 to source code 136 for generating purchase order data, copies of revisions 11-19 to source code 138, and a copy of revision 20 to source code 140, which may be referred to as the copy of revision 20 to source code 140 for generating sales opportunity data.

Any of the test automation frameworks 118-126 can use the hypervisor 116, which may be a Microsoft Hyper-V® hypervisor, to create virtual machines. The virtual machines may include a first virtual machine 142, which may be referred to as Ann's virtual machine 142, a second virtual machine 144, which may be referred to as Bob's virtual machine 144, a third virtual machine 146, a fourth virtual machine 148, and a fifth virtual machine 150, which may be referred to as the software developer Chris' virtual machine 150. Any of the virtual machines 142-150 may be a Linux virtual machine, a Windows virtual machine, or any other type of suitable virtual machine. A virtual machine usually emulates an existing architecture, including disks, such as the first virtual machine 142, the second virtual machine 144, the third virtual machine 146, the fourth virtual machine 148, and the fifth virtual machine 150 including a first virtual machine disk 152, a second virtual machine disk 154, a third virtual machine disk 156, a fourth virtual machine disk 158, and a fifth virtual machine disk 160, respectively. The first virtual machine disk 152 may be referred to as Ann's virtual machine disk 152, the second virtual machine disk 154 may be referred to as Bob's virtual machine disk 154, and the fifth virtual machine disk 160 may be referred to as Chris' virtual machine disk 160.

Virtual machine disks can store copies of applications, such as the first virtual machine disk 152, the second virtual machine disk 154, the third virtual machine disk 156, the fourth virtual machine disk 158, and the fifth virtual machine disk 160, storing a copy of application 162, a copy of application 164, a copy of application 166, a copy of application 168, and a copy of application 170, respectively. The copy of application 162 may be referred to as Ann's copy of the CRM application 162, the copy of application 164 may be referred to as Bob's copy of the CRM application 164, and the copy of application 170 may be referred to as Chris' copy of the CRM application 170. Copies of applications can include revisions to source code or copies of revisions to source code, such as the copy of application 162 includes copies of revisions 1-9 to source code 172 and revision 10 to source code 174, the copy of application 164 includes copies of revisions 1-19 to source code 176 and revision 20 to source code 178. Similarly, the copy of application 166 includes copies of revisions 1-9 to source code 180 and a copy of revision 10 to source code 182, the copy of application 168 includes copies of revisions 1-9 to source code 184 and a copy of revision 10 to source code 186, and the copy of application 170 includes copies of revisions 1-19 to source code 188 and a copy of revision 20 to source code 190. The revision 10 to source code 174 may be referred to as Ann's revision 10 to source code 174 for generating purchase order data, the revision 20 to source code 178 may be referred to as Bob's revision 20 to source code 178 for generating sales opportunity data, and the copy of revision 20 to source code 190 may be referred to as Chris' copy of Bob's revision 20 to source code 190 for generating purchase order data.

Similar to other objects, snapshots may be made of virtual machine objects. Any of the test automation frameworks 118-126 can initiate the volume snapshot service 130 (or a volume snapshot service 196 which is described below as cloud-based), which may be a Microsoft® Volume Shadow Copy Service, to create a snapshot of any of the virtual machines 142-150. A snapshot of any of the virtual machines 142-150 may be created by creating a snapshot of the corresponding virtual machine disks 152-160, which store the corresponding copies of applications 162-170, which include the corresponding revisions to source codes revisions and copies of revisions to source code, 172-190, respectively.

A data object, such as a snapshot, may be stored on cloud storage, which is a model of data storage in which digital data is stored in logical pools, with the physical storage spanning multiple servers, and often locations, and the physical environment typically owned and managed by a hosting company. A cloud storage provider is responsible for keeping the stored data available and accessible, and the physical environment protected and running. People and organizations buy or lease storage capacity from a cloud storage provider to store user, organization, and/or application data. Cloud storage services may be accessed through a co-located cloud computer service, a web service application programming interface (API), or by applications that utilize a web service API, such as cloud desktop storage, a cloud storage gateway, or Web-based content management systems.

In a general case of storing snapshots in cloud storage, the volume snapshot service 130 reads data on any of the virtual machine disks 152-160, optionally de-duplicates/compresses the snapshot data, catalogues the snapshot data, and sends the snapshot data to a cloud storage gateway 192, which exposes a file system interface backed by a cloud storage 194. Any data written to the file system interface exposed by the cloud storage gateway 192 ends up getting written to the cloud storage 194. Often the cloud storage gateway 192 is an intelligent device (like Maginatics or SteelStore) and has built-in de-duplication/compression capabilities. The cloud storage gateway 192 may be a network appliance or server that resides at a customer's premises and can translate cloud storage application programming interfaces to block-based storage protocols. Examples of cloud storage application programming interfaces include Simple Object Access Protocol (SOAP) and Representational State Transfer (REST). Examples of block-based storage protocols include Internet Small Computer System Interface (iSCSI), Fibre Channel, and file-based interfaces such as Network File System (NFS) and Server Message Block (SMB), one version of which is also known as Common Internet File System (CIFS). A file system interface may be an API (application programming interface) through which a utility or user program requests the storing and retrieving of data. The cloud storage gateway 192 can serve as an intermediary to multiple cloud storage providers. For example, the cloud storage 194 may be a Google® cloud platform, an Amazon Web Services® cloud platform, and/or a Microsoft® Azure cloud platform, and can use the volume snapshot service 196 to create snapshots of applications and can store snapshots of applications in a snapshot database 198. The software development server 108 can initiate the volume snapshot service 130 or the volume snapshot service 196 to use tagging features of the cloud storage 194 to identify a change-list and related information, such as the version of the application corresponding to the change list, and the snapshot database 198 can store tens of thousands of snapshots of applications.

FIG. 1 depicts the system 100 with three clients 102-106, one server 108, one network 110, one source control management system 112, one source code depository 114, one hypervisor 116, six test automation frameworks 118-128, two volume snapshot services 130 and 196, five virtual machines 142-150, five virtual machine disks 152-160, six copies of applications 132 and 162-170, fourteen revisions to source code and copies of revisions to source code 134-140 and 172-190, one cloud storage gateway 192, one cloud storage 194, and one snapshot database 198. However, the system 100 may include any number of each of the clients 102-106, server 108, network 110, source control management system 112, source code depository 114, hypervisor 116, test automation frameworks 118-128, volume snapshot services 130 and 196, virtual machines 142-150, virtual machine disks 152-160, copies of applications 132 and 162-170, revisions to source code and copies of revisions to source code 134-140 and 172-190, cloud storage gateway 192, cloud storage 194, and snapshot database 198. FIG. 1 depicts the components 112-190 residing completely on the server 108, but the components 112-190 may reside in any combination of partially on the server 108, partially on the clients 102-106, and partially on other servers that are not depicted.

The software development server 108 can respond to a request by a software developer to generate a virtual machine for developing an application by creating a temporary virtual machine, retrieving a copy of the application, storing the copy of the application in the temporary virtual machine's disk, saving the developer's revisions to the application's source code, and subsequently deleting the temporary virtual machine. For example, at 11:30 A.M. on Tuesday Sep. 1, 2020, the software developer Ann requests to develop a CRM application, the first autobuild system 118 creates the first virtual machine 142, retrieves the CRM application 132 from the source code repository 114 or a snapshot of the CRM application from the snapshot database 198, and stores the retrieved CRM application on the first virtual machine disk 152. Since other software developers have already committed revisions 1-9 to the source code of the CRM application, the CRM application 132 in the source code repository 114 includes the copies of revisions 1-9 to source code 134, or the snapshot of the CRM application in the snapshot database 198 includes copies of the revisions 1-9 to source code. Consequently, after the first autobuild system 118 creates the first virtual machine 142, the copy of application 162 stored in the first virtual machine disk 152 already includes the copies of revisions 1-9 to source code 172.

In another example, at 3:00 P.M. on Tuesday Sep. 1, 2020, the software developer Bob requests to develop the CRM application, the second autobuild system 120 creates the second virtual machine 144, retrieves the CRM application 132 from the source code repository 114 or a snapshot of the CRM application from the snapshot database 198, and stores the retrieved CRM application on the second virtual machine disk 154. Since by 5:00 P.M., other software developers have already committed revisions 1-19 to the source code of the CRM application, the CRM application 132 in the source code repository 114 includes the copies of revisions 1-9 to source code 134, the copy of revision 10 to source code 136, and the copies of revisions 11-19 to source code 138, or the snapshot of the CRM application in the snapshot database 198 includes copies of the source code revisions 1-19. Consequently, after the second autobuild system 120 creates the second virtual machine 144, the copy of application 164 stored in the second virtual machine disk 154 already includes the copies of revisions 1-19 to source code 176.

When a software developer commits their working copy of source code to the source code repository 114, the software development server 108 creates a change list that references all revisions that the software developer made in their committed working copy of the source code, and references the preceding revisions that software developers made in their recently committed working copies. Next the software development server 108 may delete the software developer's virtual machine that created the software developer's revisions to source code if the software developer indicates that the temporary virtual machine is no longer needed for the day. Then the software development server 108 tests a version of the application that includes the software developer's revisions to source code to verify that the revisions to source code do not introduce any errors during the execution of the application. Therefore, the software development server 108 starts the testing process by selecting a change list that corresponds to at least one change in an application executed by a virtual machine. For example, the snapshot autobuild system 128 selects a change list which indicates that the software developer Ann used Ann's virtual machine 142 via Ann's client 102 to create Ann's revision 10 to source code 174 for generating purchase order data in Ann's copy of the CRM application 162, with the change list also including the copies of revisions 1-9 to source code 172 that software developers recently committed. The change list also indicates that at 1:30 P.M. on Tuesday Sep. 1, 2020, Ann committed this revision to the source code repository 114 as the copy of revision 10 to source code 136 for generating purchase order data, in the CRM application 132. The source code repository 114 identified Ann's revision as the copy of revision 10 to source code 136 because the source code repository 114 had already committed the copies of revisions 1-9 to source code 134.

In another example, the snapshot autobuild system 128 selects a change list which indicates that the software developer Bob used Bob's virtual machine 144 via Bob's client 104 to create Bob's revision 20 to source code 178 for generating sales opportunity data in Bob's copy of the CRM application 164, with the change list also including the copies of revisions 1-19 to source code 176 that software developers recently committed. The change list also indicates that at 5:00 P.M. on Tuesday Sep. 1, 2020, Bob committed this revision to the source code repository 114 as the copy of revision 20 to source code 140 for generating sales opportunity data in the CRM application 132. The source code repository 114 identified Bob's revision as the copy of revision 20 to source code 140 because the source code repository 114 had already committed the copies of revisions 1-9 to source code 134, the copy of revision 10 to source code 136, and the copies of revisions 11-19 to source code 138.

A change list may correspond to at least one change of source code in an application and/or metadata associated with the application. For example, the change list which indicates that Ann created Ann's revision 10 to source code 174 for generating purchase order data in Ann's copy of the CRM application 162, also indicates that Ann revised the metadata for the copy of the CRM application 162 to enable the correct execution of Ann's revision 10 to source code 174 for generating purchase order data. A change can be a revision. Source code can be a text listing of commands to be compiled or assembled into an executable computer program. Metadata can be a set of information that describes other information.

Since a change list can be a set of all revisions made to an application since a point in time, the change list can cumulatively include revisions that multiple software developers made to their working copies of the source code. If software developers commit only a relatively small number of revisions to source code each day for an application that is small relative to the available storage capacity for snapshots, the software development server 108 can select each of the change lists for the relatively small number of revisions to source code, and then create a snapshot of each version of the application corresponding to each selected change list, and retain each snapshot for a relatively long time. However, if software developers commit a relatively large number of revisions to source code each day for an application that is large relative to the available storage capacity for snapshots, a system administrator may decide not to create a snapshot of each version of the application corresponding to each of the relatively large number of change lists. Therefore, the software development server 108 can include a policy engine that enables a user such as a system administrator to define the rate of taking snapshots for change lists and the snapshot retention, such that a change list which corresponds to a snapshot of an application may be selected from multiple change lists corresponding to the application. For example, a system administrator can instruct the software development server 108 to select every other change list of the 1,000 changes lists generated each day, such that the software development server 108 will select 500 change lists each day and then create 500 snapshots of applications each day, which correspond to the 500 change lists that are selected each day.

After selecting a change list for a version of an application that will be saved as a snapshot, the software development server 108 provides an execution pipeline that enables users to define scripts to be executed that "clean up" the application before a snapshot is taken of the application. Examples of execution pipeline scripts' options include enabling a user to reduce the size of the subsequent snapshot by removing end user documentation and security features from the sections of the application that the snapshot will copy because the testing of the application in a secure test environment will not require the end user documentation or security features. Then the software development server 108 creates a snapshot of the application corresponding to the selected change list. For example, the snapshot autobuild system 128 initiates the volume snapshot service 196 to create a snapshot of Ann's copy of the CRM application 162, which includes Ann's revision 10 to source code 174 for generating purchase order data and the copies of revisions 1-9 to source code 172 that software developers recently committed, by creating a snapshot of Ann's virtual machine disk 152 in Ann's virtual machine 142. In another example, the snapshot autobuild system 128 initiates the volume snapshot service 196 to create a snapshot of Bob's copy of the CRM application 164, which includes Bob's revision 20 to source code 178 for generating sales opportunity data and the copies of revisions 1-19 to source code 176 that software developers recently committed, by creating a snapshot of Bob's virtual machine disk 154 in Bob's virtual machine 144. A snapshot can be a record of the contents of a storage location or data file at a given time.

Following the creation of a snapshot of an application, the software development server 108 can create at least one additional virtual machine based on the snapshot of the application. For example, the third autobuild system 122 and the fourth autobuild system 124 use the snapshot of Ann's copy of the CRM application 162, which includes Ann's revision 10 to source code 174 for generating purchase order data and the copies of revisions 1-9 to source code 172 that software developers recently committed, to create the third virtual machine 146 and the fourth virtual machine 148, respectively. In another example, the fifth autobuild system 126 uses the snapshot of Bob's copy of the CRM application 164, which includes Bob's revision 20 to source code 178 for generating sale opportunity data and the copies of revisions 1-19 to source code 176 that software developers recently committed, to create the fifth virtual machine 150.

Having created at least one additional virtual machine, the at least one additional virtual machine can execute a test of an application which includes at least one change corresponding to a change list. For example, the software development server 108 distributes the 200 different test cases, which are required to test a version of the CRM application, between the third virtual machine 146 and the fourth virtual machine 148. Consequently, the third virtual machine 146 executes only 100 of the different tests cases to test the copy of the CRM application 166 that includes the copy of revision 10 to source code 182 for generating purchase order data and the copies of revisions 1-9 to source code 180 that software developers recently committed. Similarly, the fourth virtual machine 148 executes only 100 of the different tests cases to test the copy of the CRM application 168 that includes the copy of revision 10 to source code 186 for generating purchase order data and the copies of revisions 1-9 to source code 184 that software developers recently committed. The snapshot of the version of the CRM application that includes Ann's revision enabled the software development server 108 to minimize the computer resources required to efficiently and quickly create the virtual machines 146-148 for testing the CRM application, which may be subsequently developed after the testing. The software development server 108 did not spend a significant amount of computer resources creating one virtual machine by synchronizing the source code from a base image created at 2:00 A.M. with the source code from the large amount of changes in the change list created at 1:30 P.M., and repeating the same inefficient and slow process creating the other virtual machine. Since running full tests may require a significantly large number of test cases, being able to quickly and efficiently create the virtual machines that will run the significantly large number of distributed test case results in a significant savings of computer resources and a reduction in the load on the source code repository and the artifacts storage. A test can be a procedure intended to establish the quality, performance, or reliability of something, especially before it is taken into widespread use.

In another example, the fifth virtual machine 150 executes 200 of the different tests cases to test the copy of the CRM application 170 that includes the copy of revision 20 to source code 190 for generating sales opportunity data and the copies of revisions 1-19 to source code 188 that software developers recently committed. In yet another example, if 24,000 different test cases are required to run ftests on an application, then the software development server 108 creates 100 virtual machines and distributes the 24,000 different test cases, which are required to test a version of the CRM application, between the 100 virtual machines. Consequently, each of the 100 virtual machines executes only 240 of the different tests cases to run ftests on their copy of a version of the CRM application that includes their copy of a revision to source code, such that the computer resources saved by efficiently and quickly creating each virtual machine are multiplied by a factor of 100.

If only a relatively small number of snapshots are created of versions of an application corresponding to change lists, then the software development server 108 needs to spend only a relatively small amount of computer resources running tests on the relatively small number of applications created from the relatively small number of snapshots. However, if a relatively large number of snapshots are created of versions of an application corresponding to change lists, then the software development server 108 may need to spend a relatively large amount of computer resources running tests on the relatively large number of applications created from the relatively large number of snapshots.

Therefore, the software development server 108 can test applications based on batches of change lists, such that a change list that corresponds to an application being tested is selected from a subset of the change lists corresponding to the application. A subset can be a part of a larger group of related things. For example, the software development server 108 avoids testing all 1,000 instances of an application created in 1,000 virtual machines from 1,000 application snapshots corresponding to the 1,000 changes lists generated each day. Instead, the software development server 108 selects every tenth change list (100 change lists) that corresponds to one tenth of the potential application snapshots (100 snapshots), which are used to generate one tenth of the potential virtual machines (100 virtual machines) that execute one tenth of the potential instances of an application (100 instances of the application). Applying this example, instead of the software development server 108 testing any of the versions of the CRM application which correspond to the change lists numbers 1-9, the third virtual machine 146 tests the copy of the CRM application 166, which includes the copy of revision 10 to source code 182 for generating purchase order data, because the copy of the CRM application 166 corresponds to the change list number 10. If the copy of the CRM application 166, which corresponds to the change list number 10, passes all of the tests, then the versions of the CRM application which correspond to the change list numbers 1-9 also passed all of the tests because the copy of the CRM application 166 that corresponds to the change list number 10 also includes the preceding revisions which correspond to the change lists numbers 1-9.

Similarly, instead of testing any of the versions of the CRM application which correspond to the change lists numbers 1-19, the fifth virtual machine 150 tests the copy of the CRM application 170 which corresponds to the change list number 20. If the copy of the CRM application 170, which corresponds to the change list number 20, passes all of the tests, then the versions of the CRM application which correspond to the change lists numbers 1-19 also passed all of the tests because the copy of the CRM application 170 that corresponds to the change list number 20 also includes the preceding revisions which correspond to the change lists numbers 1-19.

After executing a test of an application which includes at least one change corresponding to a change list, the software development server 108 can determine whether executing the test of the application which includes the at least one change corresponding to the change list results in any test failures. For example, the third virtual machine 146 determines whether any of the 100 different tests cases that tested the copy of the CRM application 166, which includes the revision 10 to source code 174 for generating purchase order data and the copies of revisions 1-9 to source code 172 that software developers recently committed, resulted in any test failures. In another example, the fifth virtual machine 150 determines whether any of the 200 different tests cases that tested the CRM application coy 170, which includes the copy of revision 20 to source code 190 for generating sales opportunity data and the copies of revisions 1-19 to source code 188 that software developers recently committed, resulted in any test failures. A test failure can be a lack of success for a procedure intended to establish the quality, performance, or reliability of something, especially before it is taken into widespread use.

If executing a test of an application, which includes at least one change corresponding to a change list, results in any test failures, the software development server 108 can execute a test of a version of the application that includes another change corresponding to another change list which chronologically precedes the change list. For example, the third virtual machine 146 determines that no test failures resulted from any of the 100 different tests cases that tested the copy of the CRM application 166, which corresponds to change list number 10, such that testing a previous version of the CRM application that corresponds to a previous change list is unnecessary. In another example, the fifth virtual machine 150 identified a test failure from one of the 200 different tests cases that tested the copy of the CRM application 170, which corresponds to change list number 20, such that testing a previous version of the CRM application that corresponds to a previous change list is necessary. Collectively, the fifth virtual machine 150 determined that a test failure resulted from testing the copy of the CRM application 170, which corresponds to change list number 20, and the third virtual machine 146 determined no test failure resulted from testing the copy of the CRM application 166, which corresponds to change list number 10. Therefore, the software development server 108 identifies the need to test a version of the CRM application that corresponds to a change list numbered less than 20, but greater than 10, such as the change list number 15, to begin narrowing down which change list's revisions to the source code is responsible for the test failure.

The software development server 108 can repeat the retesting procedure recursively. If a test failure resulted from testing the version of the CRM application that corresponds to the change list number 15, then the next test would be of a version of the CRM application corresponding to a change list numbered less than 15, but greater than 10, such as change list number 13. If no test failure resulted from testing the version of the CRM application that corresponds to the change list number 15, then the next test would be of a version of the CRM application corresponding to a change list numbered greater than 15, but less than 20, such as change list number 18. A version can be a particular form of something differing in certain respects from an earlier form or other forms of the same type of thing.

After using the snapshot of an application that corresponds to a change list to create any virtual machines that run the full tests, the software development server 108 provides consistency by using any virtual machines, which were created from the same snapshot of the application that corresponds to the same change list, to rerun the tests failures from the full tests, Since the snapshot database 198 can store snapshots for days or weeks, the snapshots can guarantee the consistency of the application running tests for many retries. Consequently, the use of a change list-based snapshot of an application provides higher quality tests results and therefor improved debugging capabilities. By eliminating the false negative test failures, change list-based snapshots of applications can increase software developers' productivity, thereby improving software products.

Following the creation of a snapshot of an application for a change list, the software development server 108 associates the snapshot of the application with the change list. For example, the snapshot autobuild system 128 associates the snapshot of Bob's copy of the CRM application 164 with the change list that includes Bob's revision 20 to source code 178 for generating sales opportunity data and the copies of revisions 1-19 to source code 176 that software developers recently committed. Having associated a snapshot of an application with its change list, the software development server 108 stores the snapshot of the application with snapshots of versions of the application associated with other change lists. For example, the volume snapshot service 130 uses the cloud storage gateway 192 to send the snapshot of Bob's copy of the CRM application 164, which includes Bob's revision 20 to source code 178 for generating sales opportunity data and the copies of revisions 1-19 to source code 176 that software developers recently committed, to the cloud storage 194, which stores the snapshot in the snapshot database 198.

After storing snapshots of applications associated with change lists, the software development server 108 receives a request to create another virtual machine based on a version of an application corresponding to a specified time and/or a specified change list. For example, the software development server 108 receives a request at 9:00 A.M. on Thursday Sep. 3, 2020, from Bob's coworker Chris via Chris' client 106, to create a virtual machine for Chris based on the change list created at 5:00 P.M. on Tuesday Sep. 8, 2020, which references Bob's copy of the CRM application 164 that includes Bob's revision 20 to source code 178 that generates sales opportunity data and the copies of revisions 1-19 to source code 176 that software developers recently committed. In addition to requesting the creation of a virtual machine based on a specified change list or a specified time, the software development server 108 may enable the user an option to select which database will be combined with the application snapshot to create the requested virtual machine, and to confirm that a copy of the selected database is available for use with the created virtual machine. A request can be an instruction to a computer to provide information or perform another function. A specified time can be a clearly identified chronological point as measured in hours and minutes past midnight or noon. A specified change list can be a clearly identified set of all revisions made to an application since a point in time Following the receipt of a request for a snapshot of an application which is associated with a specified time and/or a specified change list, the software development server 108 retrieves an application snapshot which is associated with the specified time and/or the specified change list. For example, the fifth autobuild system 126 uses the volume snapshot service 196 to identify the snapshot which was created for the change list generated at 5:00 P.M. on Tuesday Sep. 1, 2020. Then the fifth autobuild system 126 uses the cloud storage gateway 192 to retrieve the snapshot of Bob's copy of the CRM application 164, which includes Bob's revision 20 to source code 178 that generates sales opportunity data and the copies of revisions 1-19 to source code 176 that software developers recently committed, from the snapshot database 198 in the cloud storage 194. An application snapshot can be a record at a given time of the contents of a storage location or a data file for a computer program or piece of software designed and written to fulfill a particular purpose of a user.

Having retrieved an application snapshot, the software development server 108 creates another virtual machine based on the application snapshot. For example, the fifth autobuild system 126 uses the snapshot of Bob's copy of the CRM application 164, which includes Bob's revision 20 to source code 178 that generates sales opportunity data and the copies of revisions 1-19 to source code 176 that software developers recently committed, to create Chris' virtual machine 150. When created, Chris' virtual machine 150 includes Chris' copy of the CRM application 170, which includes Chris' copy of Bob's revision 20 to source code 190 that generates sales opportunity data and Chris' copies of revisions 1-19 to source code 188 that software developers recently committed.

Since the policy engine can enable a system administrator to define the rate of taking snapshots for each change list, such as instructing the software development server 108 to create snapshots of applications for every other change list, a user may identify a specific change list when requesting the application snapshot for the specific change list, even though no application snapshot was created for the change list. For example, the software development server 108 may create a snapshot of an application for even numbered change lists, and a user may specify change list number 11 to request an application snapshot that was not actually created after a software developer committed revisions to source code which correspond to the change list number 11. Consequently, the software development server 108 can retrieve the application snapshot that preceded the requested application snapshot which was not created, and then synchronize the source code from the preceding application snapshot with the source code from the specified change list. Therefore, creating the other virtual machine based on the application snapshot may include synchronizing source code from the application snapshot with source code from a change list associated with the specified time and/or the specified change list, downloading any changes in metadata associated with the change list associated with the specified time and/or the specified change list, and compiling any downloaded changes in metadata. For example, if the user specified change list number 11 to request a virtual machine that executes an application stored by the application snapshot for change list number 11, and application snapshots were created only for even numbered change lists, the software development server 108 can retrieve the application snapshot for the change list number 10, and then synchronize the source code from the application snapshot for the change list number 10 with the source code for change list number 11 to create the required source code, download any metadata changes for change list number 11, and compile any downloaded metadata changes.

After using a snapshot of an application corresponding to a specified time and/or a specified change list to create another virtual machine, the other virtual machine executes the version of the application corresponding to the specified time and/or the specified change list. For example, Chris' virtual machine 150 executes Chris' copy of the CRM application 170, which includes Chris' copy of Bob's revision 20 to source code 190 that generates sales opportunity data and Chris' copies of revisions 1-19 to source code 188 that software developers recently committed. Even though Chris requested that a version of an application which has not been used for more than a day to be used to create a virtual machine for further development and possible testing of the application, the software development server 108 efficiently and quickly created the virtual machine exactly as Chris requested, which may not have been possible if daily base images were still being used to create virtual machines.

A virtual machine executing a version of an application may include running an additional test in a testing environment and/or enabling changes of source code in a development environment. For example, Chris can use Chris' virtual machine 146 executing Chris' copy of the CRM application 170, which includes Chris' copy of Bob's revision 20 to source code 190 that generates sales opportunity data and Chris' copies of revisions 1-19 to source code 188 that software developers recently committed, to continue developing revisions to the source code that generates sales opportunity data, or to run additional tests on Chris' copy of the CRM application 170. Using current cloud native technologies, the snapshot time and re-provisioning time have been reduced into ranges of minutes or seconds, thereby greatly reducing the total amount of time required for running all the tests of an application created in a virtual machine from a snapshot corresponding to a change-list. A testing environment can be the overall structure within which a computer program operates to establish the quality, performance, or reliability of something, especially before it is taken into widespread use. A development environment can be the overall structure within which computer program operates to generate software.

Figure 2:
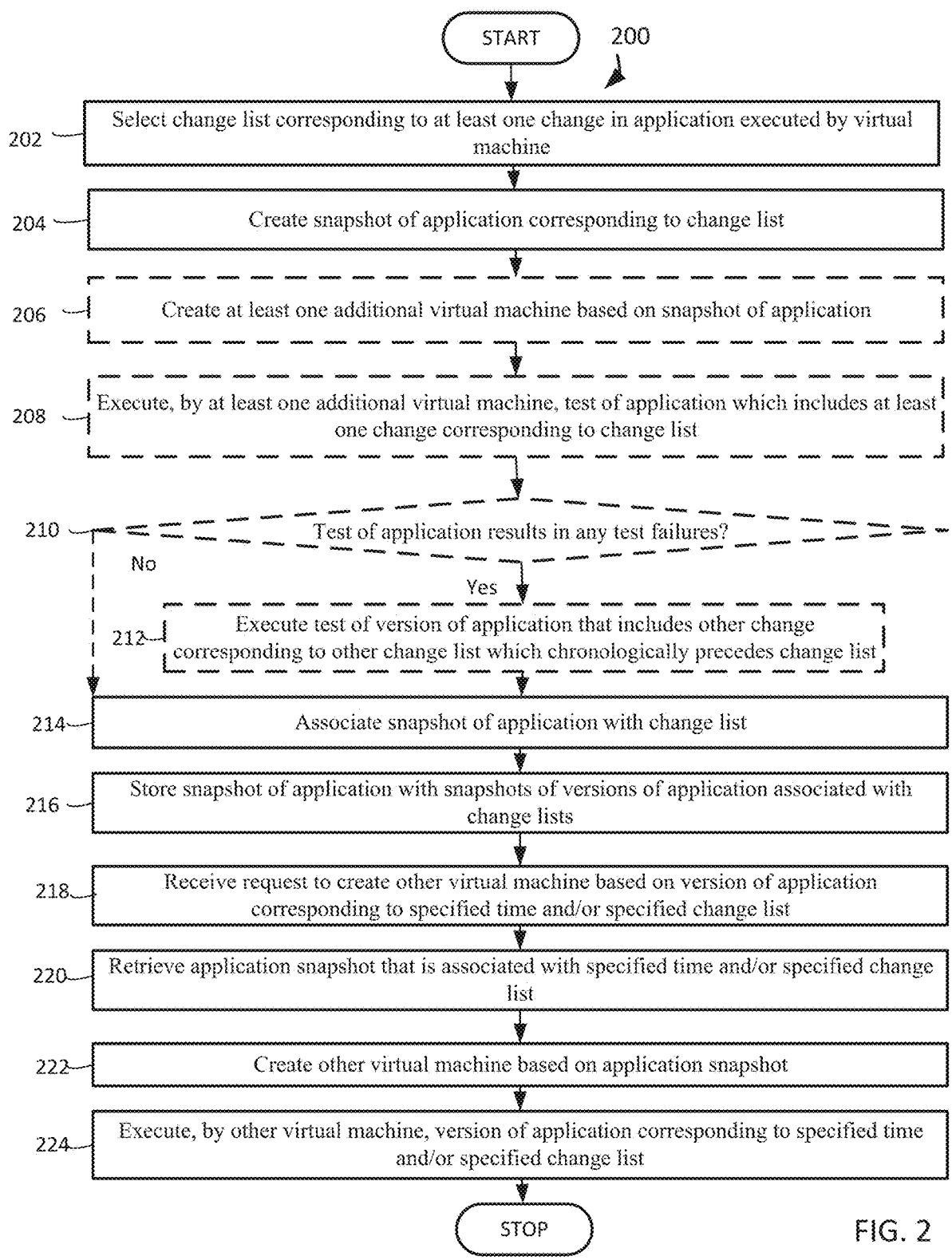
FIG. 2 is an operational flow diagram illustrating a high-level overview of a method for change list-based snapshots of applications for development and testing, in an embodiment.

FIG. 2 is an operational flow diagram illustrating a high-level overview of a method 200 for change list-based snapshots of applications for development and testing. A change list is selected as corresponding to at least one change in an application executed by a virtual machine, block 202. The system selects a change list for an application for which a snapshot is to be created. For example, and without limitation, this can include the snapshot autobuild system 128 selecting a change list, which indicates that Ann used Ann's virtual machine 142 via Ann's client 102 to create Ann's revision 10 to source code 174 for generating purchase order data, in Ann's copy of the CRM application 162. The change list also indicates that at 1:30 P.M. on Tuesday Sep. 1, 2020, Ann committed this revision to the source code repository 114 as the copy of revision 10 to source code 136 for generating purchase order data, in the CRM application 132.

In another example, the snapshot autobuild system 128 selects a change list which indicates that the Bob used Bob's virtual machine 144 via Bob's client 104 to create Bob's revision 20 to source code 178 for generating sales opportunity data, in Bob's copy of the CRM application 164. The change list also indicates that at 5:00 P.M. on Tuesday Sep. 1, 2020, Bob committed this revision to the source code repository 114 as the copy of revision 20 to source code 140 for generating sales opportunity data, in the CRM application 132.

After selecting a change list for an application, a snapshot is created of the application corresponding to the change list, block 204. The system creates a snapshot of an application for a change list. By way of example and without limitation, this can include the snapshot autobuild system 128 initiating the volume snapshot service 196 to create a snapshot of Ann's copy of the CRM application 162, which includes Ann's revision 10 to source code 174 for generating purchase order data, by creating a snapshot of Ann's virtual machine disk 152 in Ann's virtual machine 142. In another example, the snapshot autobuild system 128 initiates the volume snapshot service 196 to create a snapshot of Bob's copy of the CRM application 164, which includes Bob's revision 20 to source code 178 for generating sales opportunity data, by creating a snapshot of Bob's virtual machine disk 154 in Bob's virtual machine 144.

Following the creation of a snapshot of an application, at least one additional virtual machine is optionally created based on the snapshot of the application, block 206. The system can use application snapshots for change lists to efficiently and quickly create virtual machines. In embodiments, this can include the third autobuild system 122 and the fourth autobuild system 124 using the snapshot of Ann's copy of the CRM application 162, which includes Ann's revision 10 to source code 174 for generating purchase order data, to create the third virtual machine 146 and the fourth virtual machine 148, respectively. In another example, the fifth autobuild system 126 uses the snapshot of Bob's copy of the CRM application 164, which includes Bob's revision 20 to source code 178 for generating sale opportunity data, to create the fifth virtual machine 150.

Having created at least one additional virtual machine, the at least one additional virtual machine optionally executes a test of an application which includes at least one change corresponding to a change list, block 208. The system can use any virtual machines created from an application's snapshot to distribute the testing of the application. For example, and without limitation, this can include the software development server 108 distributing the 200 different test cases, which are required to test a version of the CRM application, between the third virtual machine 146 and the fourth virtual machine 148. Consequently, the third virtual machine 146 executes only 100 of the different tests cases to test the copy of the CRM application 166 that includes the copy of revision 10 to source code 182 for generating purchase order data, and the fourth virtual machine 148 executes only 100 of the different tests cases to test the copy of the CRM application 168 that includes the copy of revision 10 to source code 186 for generating purchase order data. In another example, the fifth virtual machine 150 executes 200 of the different tests cases to test the copy of the CRM application 170 that includes the copy of revision 20 to source code 190 for generating sales opportunity data.

After executing a test of an application which includes at least one change corresponding to a change list, a determination is optionally made whether executing the test of the application which includes the at least one change corresponding to the change list results in any test failures, block 210. The system can determine if the test of an application resulted in any failure. By way of example and without limitation, this can include the third virtual machine 146 determining whether any of the 100 different tests cases that tested the copy of the CRM application 166, which includes the revision 10 to source code 174 for generating purchase order data, resulted in any test failures. In another example, the fifth virtual machine 150 determines whether any of the 200 different tests cases that tested the CRM application coy 170, which includes the copy of revision 20 to source code 190 for generating sales opportunity data, resulted in any test failures. If executing the test of the application which includes the at least one change corresponding to the change list results in any test failures, the method 200 continues to block 212 to retest the test failures on different versions of the application. If executing the test of the application which includes the at least one change corresponding to the change list does not result in any test failures, the method 200 proceeds to block 212 to optionally associate the application with a change list.

If executing a test of an application, which includes at least one change corresponding to a change list, results in any test failures, a test is optionally executed of a version of the application that includes another change corresponding to another change list which chronologically precedes the change list, block 212. The systems can retest failed application tests to identify which change list resulted in the test failure. In embodiments, this can include the third virtual machine 146 determining that no test failures resulted from any of the 100 different tests cases that tested the copy of the CRM application 166, which corresponds to change list number 10, such that testing a previous version of the CRM application that corresponds to a previous change list is unnecessary. In another example, the fifth virtual machine 150 identified a test failure from one of the 200 different tests cases that tested the copy of the CRM application 170, which corresponds to change list number 20, such that testing a previous version of the CRM application that corresponds to a previous change list is necessary. Collectively, the fifth virtual machine 150 determined that a test failure resulted from testing the copy of the CRM application 170, which corresponds to change list number 20, and the third virtual machine 146 determined no test failure resulted from testing the copy of the CRM application 166, which corresponds to change list number 10. Therefore, the software development server 108 identifies the need to test a version of the CRM application that corresponds to a change list numbered less than 20, but greater than 10, such as the change list number 15, to begin narrowing down which change list's revisions to the source code is responsible for the test failure.

Following the creation of a snapshot of an application for a change list, the snapshot of the application is associated with the change list, block 214. The system identifies snapshots of applications with their corresponding change lists. For example, and without limitation, this can include the snapshot autobuild system 128 associating the snapshot of Bob's copy of the CRM application 164 with the change list that includes Bob's revision 20 to source code 178 for generating sales opportunity data.

Having associated a snapshot of an application with its change list, the snapshot of the application is stored with snapshots of versions of the application associated with other change lists, block 216. The system stores the application snapshot created for a change list with other similarly created application snapshots. By way of example and without limitation, this can include the volume snapshot service 130 using the cloud storage gateway 192 to send the snapshot of Bob's copy of the CRM application 164, which includes Bob's revision 20 to source code 178 for generating sales opportunity data, to the cloud storage 194, which stores the snapshot in the snapshot database 198.

After storing snapshots of applications associated with change lists, a request is received to create another virtual machine based on a version of the application corresponding to a specified time and/or a specified change list, block 218.

The system receives requests for snapshots of application associated with change lists to use the snapshots to create virtual machines. In embodiments, this can include the software development server 108 receiving a request at 9:00 A.M. on Thursday Sep. 3, 2020, from Bob's coworker Chris via Chris' client 106, to create a virtual machine for Chris based on the change list created at 5:00 P.M. on Tuesday Sep. 8, 2020, which reference Bob's copy of the CRM application 164 that includes Bob's revision 20 to source code 178 that generates sales opportunity data.

Following the receipt of a request for a snapshot of an application which is associated with a specified time and/or a specified change list, an application snapshot is retrieved, which is associated with the specified time and/or the specified change list, block 220. The system retrieves application snapshots associated with specified change lists and/or specified times. For example, and without limitation, this can include the fifth autobuild system 126 using the volume snapshot service 196 to identify the snapshot which was created for the change list generated at 5:00 P.M. on Tuesday Sep. 1, 2020, and using the cloud storage gateway 192 to retrieve the snapshot of Bob's copy of the CRM application 164, which includes Bob's revision 20 to source code 178 that generates sales opportunity data, from the snapshot database 198 in the cloud storage 194.

Having retrieved an application snapshot, another virtual machine is created based on the application snapshot, block 222. The system uses application snapshots for change lists to efficiently and quickly create virtual machines. By way of example and without limitation, this can include the fifth autobuild system 126 using the snapshot of Bob's copy of the CRM application 164, which includes Bob's revision 20 to source code 178 that generates sales opportunity data, to create Chris' virtual machine 150, which includes Chris' copy of the CRM application 170, which includes Chris' copy of Bob's revision 20 to source code 190 that generates sales opportunity data.

After using a snapshot of an application corresponding to a specified time and/or a specified change list to create another virtual machine, the other virtual machine executes the version of the application corresponding to the specified time and/or the specified change list, block 224. A virtual machine executes an application from the application snapshot used to efficiently and quickly create the virtual machine. In embodiments, this can include Chris' virtual machine 150 executing Chris' copy of the CRM application 170, which includes Chris' copy of Bob's revision 20 to source code 190 that generates sales opportunity data.

The method 200 may be repeated as desired. Although this disclosure describes the blocks 202-224 executing in a particular order, the blocks 202-224 may be executed in a different order. In other implementations, each of the blocks 202-224 may also be executed in combination with other blocks and/or some blocks may be divided into a different set of blocks.

System Overview

Figure 3:
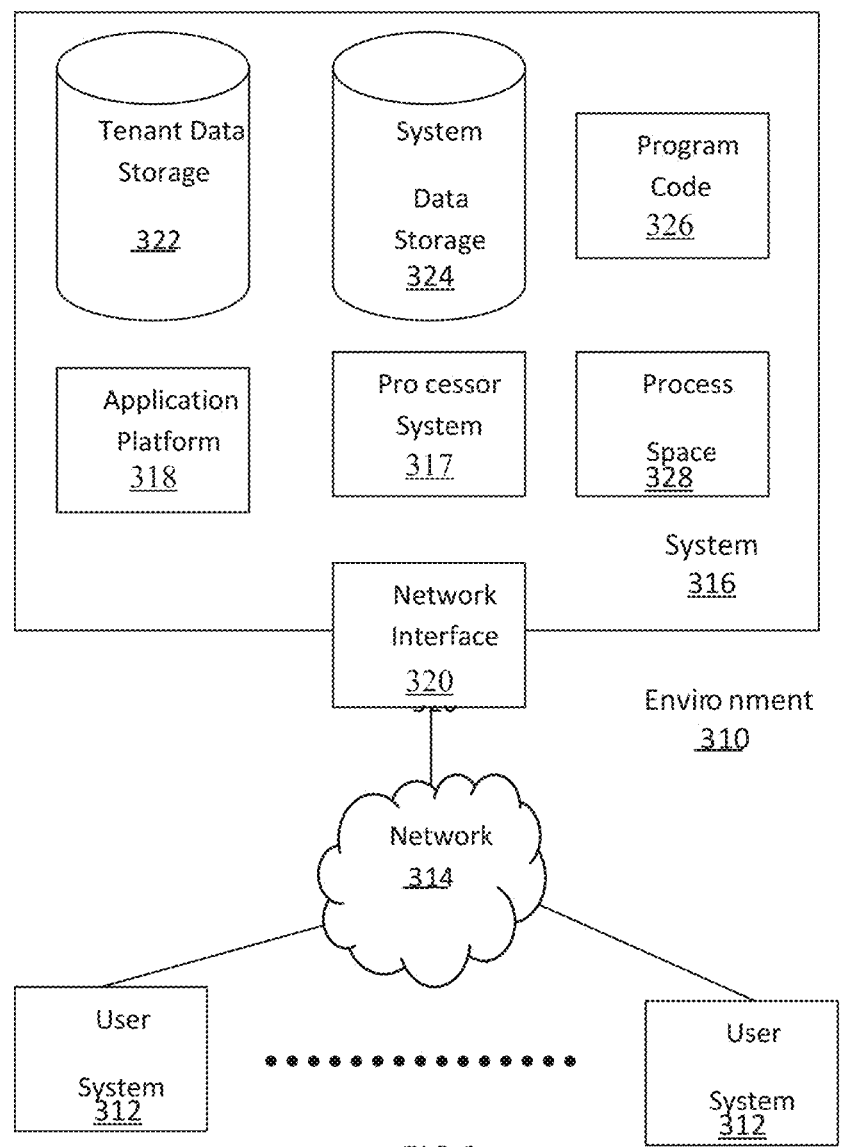
FIG. 3 illustrates a block diagram of an example of an environment wherein an on-demand database service may be used.

FIG. 3 illustrates a block diagram of an environment 310 wherein an on-demand database service might be used. The environment 310 may include user systems 312, a network 314, a system 316, a processor system 317, an application platform 318, a network interface 320, a tenant data storage 322, a system data storage 324, program code 326, and a process space 328. In other embodiments, the environment 310 may not have all of the components listed and/or may have other elements instead of, or in addition to, those listed above.

The environment 310 is an environment in which an on-demand database service exists. A user system 312 may be any machine or system that is used by a user to access a database user system. For example, any of the user systems 312 may be a handheld computing device, a mobile phone, a laptop computer, a workstation, and/or a network of computing devices. As illustrated in FIG. 3 (and in more detail in FIG. 4) the user systems 312 might interact via the network 314 with an on-demand database service, which is the system 316.

An on-demand database service, such as the system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 316" and the "system 316" will be used interchangeably herein. A database image may include one or more database objects. A relational database management system (RDMS) or the equivalent may execute storage and retrieval of information against the database object(s). The application platform 318 may be a framework that allows the applications of the system 316 to run, such as the hardware and/or software, e.g., the operating system. In an embodiment, the on-demand database service 316 may include the application platform 318 which enables creation, managing and executing one or more applications developed by the provider of the on-demand database service, users accessing the on-demand database service via user systems 312, or third party application developers accessing the on-demand database service via the user systems 312.

The users of the user systems 312 may differ in their respective capacities, and the capacity of a particular user system 312 might be entirely determined by permissions (permission levels) for the current user. For example, where a salesperson is using a particular user system 312 to interact with the system 316, that user system 312 has the capacities allotted to that salesperson. However, while an administrator is using that user system 312 to interact with the system 316, that user system 312 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 314 is any network or combination of networks of devices that communicate with one another. For example, the network 314 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 312 might communicate with the system 316 using TCP/IP and, at a higher network level, use other common Internet protocols to communicate, such as HTTP, FTP, AFS, WAP, etc. In an example where HTTP is used, the user systems 312 might include an HTTP client commonly referred to as a "browser" for sending and receiving HTTP messages to and from an HTTP server at the system 316. Such an HTTP server might be implemented as the sole network interface between the system 316 and the network 314, but other techniques might be used as well or instead. In some implementations, the interface between the system 316 and the network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 316, shown in FIG. 3, implements a web-based customer relationship management (CRM) system. For example, in one embodiment, the system 316 includes application servers configured to implement and execute CRM software applications as well as provide related data, code, forms, webpages and other information to and from the user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 316 implements applications other than, or in addition to, a CRM application. For example, the system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of the system 316 is shown in FIG. 3, including the network interface 320, the application platform 318, the tenant data storage 322 for tenant data 323, the system data storage 324 for system data 325 accessible to the system 316 and possibly multiple tenants, the program code 326 for implementing various functions of the system 316, and the process space 328 for executing MTS system processes and tenant-specific processes, such as running applications as part of an application hosting service. Additional processes that may execute on the system 316 include database indexing processes.

Several elements in the system shown in FIG. 3 include conventional, well-known elements that are explained only briefly here. For example, each of the user systems 312 could include a desktop personal computer, workstation, laptop, PDA, cell phone, or any wireless access protocol (WAP) enabled device or any other computing device capable of interfacing directly or indirectly to the Internet or other network connection. Each of the user systems 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 312 to access, process and view information, pages and applications available to it from the system 316 over the network 314. Each of the user systems 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 316 or other systems or servers. For example, the user interface device may be used to access data and applications hosted by the system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 312 and all of its components are operator configurable using applications, such as a browser, including computer code run using a central processing unit such as an Intel Pentium® processor or the like. Similarly, the system 316 (and additional instances of an MTS, where more than one is present) and all of their components might be operator configurable using application(s) including computer code to run using a central processing unit such as the processor system 317, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein. Computer code for operating and configuring the system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), micro-drive, and magneto-optical disks, and magnetic or optical cards, nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 316 is configured to provide webpages, forms, applications, data and media content to the user (client) systems 312 to support the access by the user systems 312 as tenants of the system 316. As such, the system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 4:
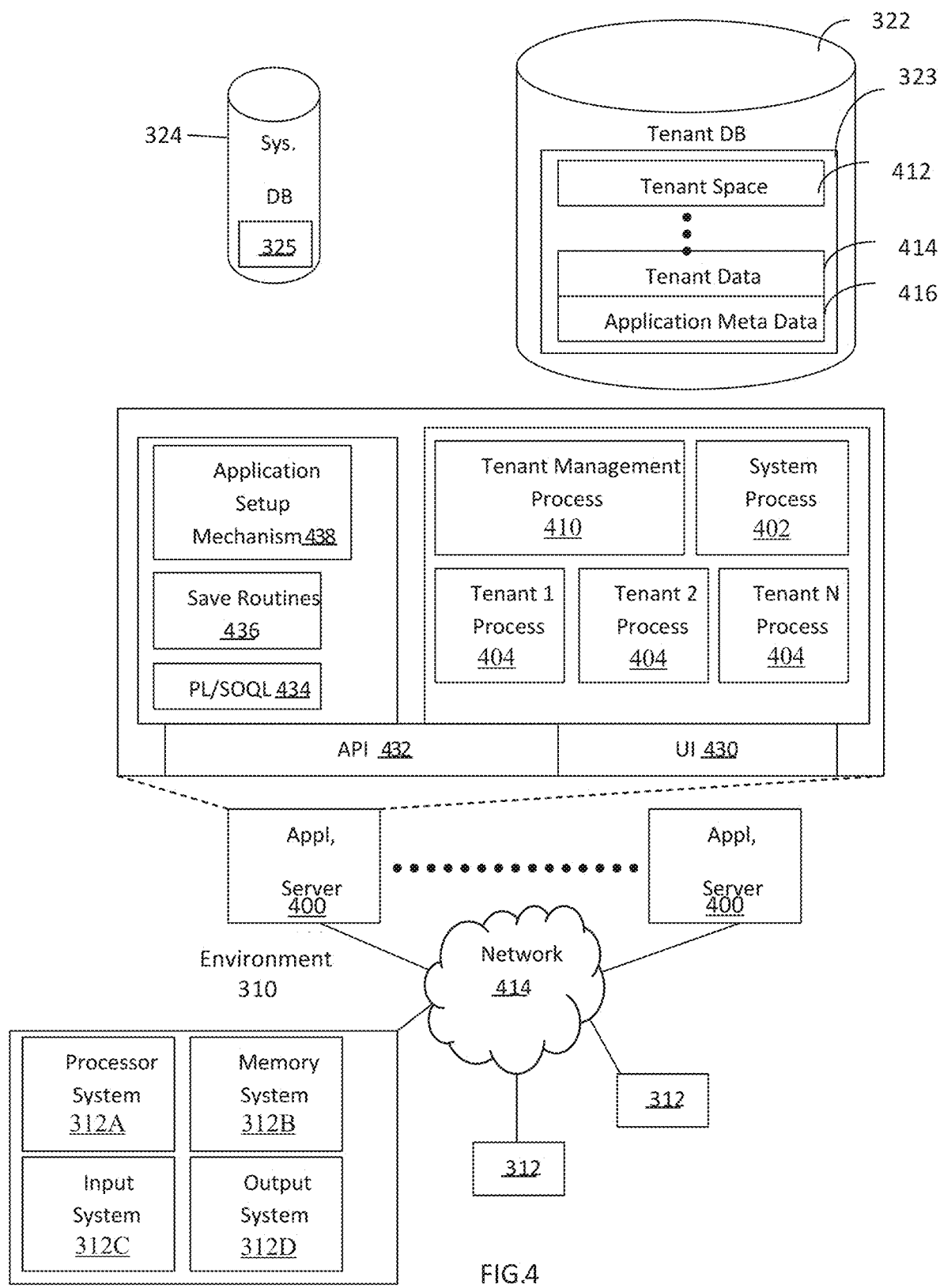
FIG. 4 illustrates a block diagram of an embodiment of elements of FIG. 3 and various possible interconnections between these elements.

FIG. 4 also illustrates the environment 310. However, in FIG. 4 elements of the system 316 and various interconnections in an embodiment are further illustrated. FIG. 4 shows that the each of the user systems 312 may include a processor system 312A, a memory system 312B, an input system 312C, and an output system 312D. FIG. 4 shows the network 314 and the system 316. FIG. 4 also shows that the system 316 may include the tenant data storage 322, the tenant data 323, the system data storage 324, the system data 325, a User Interface (UI) 430, an Application Program Interface (API) 432, a PL/SOQL 434, save routines 436, an application setup mechanism 438, applications servers $400_1$-$400_N$, a system process space 402, tenant process spaces 404, a tenant management process space 410, a tenant storage area 412, a user storage 414, and application metadata 416. In other embodiments, the environment 310 may not have the same elements as those listed above and/or may have other elements instead of, or in addition to, those listed above.

The user systems 312, the network 314, the system 316, the tenant data storage 322, and the system data storage 324 were discussed above in FIG. 3. Regarding the user systems 312, the processor system 312A may be any combination of one or more processors. The memory system 312B may be any combination of one or more memory devices, short term, and/or long term memory. The input system 312C may be any combination of input devices, such as one or more keyboards, mice, trackballs, scanners, cameras, and/or interfaces to networks. The output system 312D may be any combination of output devices, such as one or more monitors, printers, and/or interfaces to networks. As shown by FIG. 4, the system 316 may include the network interface 320 (of FIG. 3) implemented as a set of HTTP application servers 400, the application platform 318, the tenant data storage 322, and the system data storage 324. Also shown is the system process space 402, including individual tenant process spaces 404 and the tenant management process space 410. Each application server 400 may be configured to access tenant data storage 322 and the tenant data 323 therein, and the system data storage 324 and the system data 325 therein to serve requests of the user systems 312. The tenant data 323 might be divided into individual tenant storage areas 412, which may be either a physical arrangement and/or a logical arrangement of data. Within each tenant storage area 412, the user storage 414 and the application metadata 416 might be similarly allocated for each user. For example, a copy of a user's most recently used (MRU) items might be stored to the user storage 414. Similarly, a copy of MRU items for an entire organization that is a tenant might be stored to the tenant storage area 412. The UI 430 provides a user interface and the API 432 provides an application programmer interface to the system 316 resident processes to users and/or developers at the user systems 312. The tenant data and the system data may be stored in various databases, such as one or more Oracle™ databases.

The application platform 318 includes the application setup mechanism 438 that supports application developers' creation and management of applications, which may be saved as metadata into the tenant data storage 322 by the save routines 436 for execution by subscribers as one or more tenant process spaces 404 managed by the tenant management process 410 for example. Invocations to such applications may be coded using the PL/SOQL 434 that provides a programming language style interface extension to the API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 416 for the subscriber making the invocation and executing the metadata as an application in a virtual machine.

Each application server 400 may be communicably coupled to database systems, e.g., having access to the system data 325 and the tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also may be used. For example, in certain embodiments, three consecutive requests from the same user could hit three different application servers 400, and three requests from different users could hit the same application server 400. In this manner, the system 316 is multi-tenant, wherein the system 316 handles storage of, and access to, different objects, data and applications across disparate users and organizations.

As an example of storage, one tenant might be a company that employs a sales force where each salesperson uses the system 316 to manage their sales process. Thus, a user might maintain contact data, leads data, customer follow-up data, performance data, goals and progress data, etc., all applicable to that user's personal sales process (e.g., in the tenant data storage 322). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 316 might also maintain system level data usable by multiple tenants or other data. Such system level data might include industry reports, news, postings, and the like that are sharable among tenants.

In certain embodiments, the user systems 312 (which may be client systems) communicate with the application servers 400 to request and update system-level and tenant-level data from the system 316 that may require sending one or more queries to the tenant data storage 322 and/or the system data storage 324. The system 316 (e.g., an application server 400 in the system 316) automatically generates one or more SQL statements (e.g., one or more SQL queries) that are designed to access the desired information. The system data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer-implemented method for change list-based snapshots of applications for development and testing, the computer-implemented method comprising:
select a change list from a plurality of change lists corresponding to at least one change in an application executed by a virtual machine;
create a snapshot of the application, which includes unchanged source code and source code corresponding to the selected change list, in response to the selection of the change list, the snapshot being a record of the contents of a storage location of the application at a given time;
associating the snapshot of the application with the change list;
storing the snapshot of the application with a plurality of snapshots of versions of the application associated with the plurality of change lists;
receiving a request to create another virtual machine based on a version of the application corresponding to at least one of a specified time and a specified change list;
retrieving an application snapshot that is associated with at least one of the specified time and the specified change list;
creating the other virtual machine based on the application snapshot; and
executing, by the other virtual machine, the version of the application corresponding to at least one of the specified time and the specified change list.

2. The computer-implemented method of claim 1, wherein creating the other virtual machine based on the application snapshot comprises synchronizing source code from the application snapshot with source code from at least one of a change list associated with the specified time and the specified change list, downloading any changes in metadata associated with at least one of the change list associated with the specified time and the specified change list, and compiling any downloaded changes in metadata.

3. The computer-implemented method of claim 1, wherein the other virtual machine executing the version of the application comprises at least one of running an additional test in a testing environment and enabling changes of source code in a development environment.

4. The computer-implemented method of claim 1, wherein the computer-implemented method further comprises:
   creating at least one additional virtual machine based on the snapshot of the application; and
   executing, by the at least one additional virtual machine, a test of the application which includes the at least one change corresponding to the change list.

5. The computer-implemented method of claim 4, wherein the change list corresponds to at least one change of at least one of source code in the application and metadata associated with the application, the change list that corresponds to the snapshot of the application is selected from the plurality of change lists corresponding to the application, and the change list that corresponds to the application being tested is selected from a subset of the plurality of change lists corresponding to the application.

6. The computer-implemented method of claim 4, wherein the computer-implemented method further comprises:
   determining whether executing the test of the application which includes the at least one change corresponding to the change list results in any test failures; and
   executing a test of a version of the application that includes another change corresponding to another change list which chronologically precedes the change list, in response to a determination that executing the test of the application which includes the at least one change corresponding to the change list results in any test failures.

7. A system for change list-based snapshots of applications for development and testing, the system comprising:
   one or more processors; and
   a non-transitory computer readable medium storing a plurality of instructions, which when executed, cause the one or more processors to:
   select a change list from a plurality of change lists corresponding to at least one change in an application executed by a virtual machine;
   create a snapshot of the application, which includes unchanged source code and source code corresponding to the selected change list, in response to the selection of the change list, the snapshot being a record of the contents of a storage location of the application at a given time;
   associate the snapshot of the application with the change list;
   store the snapshot of the application with a plurality of snapshots of versions of the application associated with the plurality of change lists;
   receive a request to create another virtual machine based on a version of the application corresponding to at least one of a specified time and a specified change list;
   retrieve an application snapshot that is associated with at least one of the specified time and the specified change list;
   create the other virtual machine based on the application snapshot; and
   execute, by the other virtual machine, the version of the application corresponding to at least one of the specified time and the specified change list.

8. The system of claim 7, wherein the change list corresponds to at least one change of at least one of source code in the application and metadata associated with the application.

9. The system of claim 7, wherein creating the other virtual machine based on the application snapshot comprises synchronizing source code from the application snapshot with source code from at least one of a change list associated with the specified time and the specified change list, downloading any changes in metadata associated with at least one of the change list associated with the specified time and the specified change list, and compiling the downloaded changes in metadata.

10. The system of claim 7, wherein the other virtual machine executing the version of the application comprises at least one of running an additional test in a testing environment and enabling changes of source code in a development environment.

11. The system of claim 7, wherein the plurality of instructions further causes the one or more processors to
   create at least one additional virtual machine based on the snapshot of the application; and
   execute, by the at least one additional virtual machine, a test of the application which includes the at least one change corresponding to the change list.

12. The system of claim 11, wherein the change list that corresponds to the snapshot of the application is selected from the plurality of change lists corresponding to the application, and the change list that corresponds to the application being tested is selected from a subset of the plurality of change lists corresponding to the application.

13. The system of claim 11, wherein the plurality of instructions further causes the processor to:
   determine whether executing the test of the application which includes the at least one change corresponding to the change list results in any test failures; and
   execute a test of a version of the application that includes another change corresponding to another change list which chronologically precedes the change list, in response to a determination that executing the test of the application which includes the at least one change corresponding to the change list results in any test failures.

14. A computer program product comprising a non-transitory computer-readable medium having a program code embodied therein to be executed by one or more processors when retrieved from the non-transitory computer-readable medium, the program code including instructions to:
   select a change list from a plurality of change lists corresponding to at least one change in an application executed by a virtual machine;
   create a snapshot of the application, which includes unchanged source code and source code corresponding to the selected change list, in response to the selection of the change list, the snapshot being a record of the contents of a storage location of the application at a given time;
   associate the snapshot of the application with the change list;
   store the snapshot of the application with a plurality of snapshots of versions of the application associated with the plurality of change lists;

receive a request to create another virtual machine based on a version of the application corresponding to at least one of a specified time and a specified change list;

retrieve an application snapshot that is associated with at least one of the specified time and the specified change list;

create the other virtual machine based on the application snapshot; and execute, by the other virtual machine, the version of the application corresponding to at least one of the specified time and the specified change list.

15. The computer program product of claim 14, wherein the change list corresponds to at least one change of at least one of source code in the application and metadata associated with the application.

16. The computer program product of claim 14, wherein creating the other virtual machine based on the application snapshot comprises synchronizing source code from the application snapshot with source code from at least one of a change list associated with the specified time and the specified change list, downloading any changes in metadata associated with at least one of the change list associated with the specified time and the specified change list, and compiling the downloaded changes in metadata.

17. The computer program product of claim 14, wherein the other virtual machine executing the version of the application comprises at least one of running an additional test in a testing environment and enabling changes of source code in a development environment.

18. The computer program product of claim 14, wherein the program code includes further instructions to:

create at least one additional virtual machine based on the snapshot of the application; and execute, by the at least one additional virtual machine, a test of the application which includes the at least one change corresponding to the change list.

19. The computer program product of claim 18, wherein the change list that corresponds to the snapshot of the application is selected from the plurality of change lists corresponding to the application, and the change list that corresponds to the application being tested is selected from a subset of the plurality of change lists corresponding to the application.

20. The computer program product of claim 18, wherein the program code includes further instructions to:

determine whether executing the test of the application which includes the at least one change corresponding to the change list results in any test failures; and execute a test of a version of the application that includes another change corresponding to another change list which chronologically precedes the change list, in response to a determination that executing the test of the application which includes the at least one change corresponding to the change list results in any test failures.

* * * * *